US008168265B2

(12) United States Patent
Kwak et al.

(10) Patent No.: US 8,168,265 B2
(45) Date of Patent: May 1, 2012

(54) METHOD FOR MANUFACTURING ELECTROCHROMIC DEVICES

(75) Inventors: Byung Sung Kwak, Portland, OR (US); Nety Krishna, Sunnyvale, CA (US)

(73) Assignee: Applied Materials, Inc., Santa Clara, CA (US)

( * ) Notice: Subject to any disclaimer, the term of this patent is extended or adjusted under 35 U.S.C. 154(b) by 928 days.

(21) Appl. No.: 12/134,437

(22) Filed: Jun. 6, 2008

(65) Prior Publication Data

US 2009/0304912 A1     Dec. 10, 2009

(51) Int. Cl.
- *C08J 7/18* (2006.01)
- *B05D 3/06* (2006.01)
- *B05D 5/12* (2006.01)
- *B05D 5/06* (2006.01)
- *G02F 1/15* (2006.01)

(52) U.S. Cl. ............ 427/555; 427/108; 427/126.1; 427/165; 359/265

(58) Field of Classification Search ............ 427/555, 427/556, 596, 58, 108, 164; 359/265
See application file for complete search history.

(56) References Cited

U.S. PATENT DOCUMENTS

| | | | | |
|---|---|---|---|---|
| 4,568,409 A | * | 2/1986 | Caplan | 438/690 |
| 4,626,445 A | * | 12/1986 | Dobrowolski et al. | 427/7 |
| 4,626,455 A | * | 12/1986 | Karabedian | 428/34.7 |
| 4,780,177 A | * | 10/1988 | Wojnarowski et al. | 216/45 |
| 5,585,959 A | * | 12/1996 | Brown et al. | 359/273 |
| 5,724,175 A | * | 3/1998 | Hichwa et al. | 359/265 |

(Continued)

FOREIGN PATENT DOCUMENTS

EP     1434083 A2     6/2004

(Continued)

OTHER PUBLICATIONS

"Advancement of Electrochromic Windows", The Lawrence Berkeley National Laboratory, Environmental Energy Technologies Division, Building Technologies Department (Jul. 2006) http://windows.lbl.gov/comm_perf/Electrochromic/ec_desi.html, Apr. 22, 2008.

(Continued)

*Primary Examiner* — Dah-Wei Yuan
*Assistant Examiner* — Jose Hernandez-Diaz
(74) *Attorney, Agent, or Firm* — Mark J. Danielson; Pillsbury Winthrop Shaw Pittman LLP (57) ABSTRACT

This invention contemplates the use of laser patterning/scribing in electrochromic device manufacture, anywhere during the manufacturing process as deemed appropriate and necessary for electrochromic device manufacturability, yield and functionality, while integrating the laser scribing so as to ensure the active layers of the device are protected to ensure long term reliability. It is envisaged that the laser is used to pattern the component layers of electrochromic devices by directly removing (ablating) the material of the component layers. The invention includes a manufacturing method for an electrochromic device comprising one or more focused laser patterning steps. To minimize redeposition of laser ablated material and particulate formation on device surfaces a number of approaches may be used: (1) ablated material generated by the focused laser patterning may be removed by vacuum suction and/or application of an inert gas jet in the vicinity of the laser ablation of device material; (2) spatial separation of the edges of layers and patterning of lower layers prior to deposition of upper layers; and (3) the laser patterning step may be performed by a laser beam focused directly on the deposited layers from above, by a laser beam directed through the transparent substrate, or by a combination of both.

25 Claims, 6 Drawing Sheets

U.S. PATENT DOCUMENTS

| | | | | |
|---|---|---|---|---|
| 5,756,147 | A * | 5/1998 | Wu et al. | 427/66 |
| 5,824,374 | A | 10/1998 | Bradley, Jr. et al. | |
| 5,910,256 | A * | 6/1999 | Tsunetomo et al. | 216/24 |
| 5,995,271 | A * | 11/1999 | Zieba et al. | 359/265 |
| 6,094,292 | A * | 7/2000 | Goldner et al. | 359/265 |
| 6,606,184 | B2 | 8/2003 | Guarr et al. | |
| 6,841,482 | B2 | 1/2005 | Boyle | |
| 2007/0049044 | A1 * | 3/2007 | Marsh | 438/758 |
| 2007/0107776 | A1 * | 5/2007 | Li et al. | 136/263 |
| 2007/0243328 | A1 | 10/2007 | Liu et al. | |
| 2008/0241425 | A1 | 10/2008 | Li et al. | |
| 2009/0323156 | A1 * | 12/2009 | Shin et al. | 359/265 |

FOREIGN PATENT DOCUMENTS

| | | |
|---|---|---|
| WO | WO 01/90809 A1 | 11/2001 |
| WO | WO02-071138 A1 | 9/2002 |
| WO | WO2008-030025 A1 | 3/2008 |

OTHER PUBLICATIONS

Granquvist, Nature Materials, 5(2):89-90 (Feb. 2006).
European Search Report Issued Sep. 22, 2011 for European Patent Application No. 09759022.8.
International Search Report and Written Opinion issued Jan. 19, 2010 for PCT Application No. PCT/US2009/045025.

* cited by examiner

PRIOR ART

METHOD FOR MANUFACTURING ELECTROCHROMIC DEVICES

FIELD OF THE INVENTION

The present invention relates generally to electrochromic devices, and more particularly to a method for fabricating electrochromic devices including laser patterning/scribing.

BACKGROUND OF THE INVENTION

Electrochromic devices are devices that change light (and heat) transmission properties in response to voltage applied across the device. Electrochromic devices can be fabricated which electrically switch between transparent and translucent states (where the transmitted light is colored). Furthermore, certain transition metal hydride electrochromic devices can be fabricated which switch between transparent and reflective states. Electrochromic devices are incorporated in a range of products, including architectural windows, rear-view mirrors, and protective glass for museum display cases. When they are incorporated in architectural windows there is a need for the electrochromic devices to have a guaranteed lifetime of at least ten years and preferably thirty years or more. However, exposure of the electrochromic devices to atmospheric oxygen and water can degrade the performance of the devices and reduce the lifetime of the devices. Therefore, there is a need for electrochromic devices designed to withstand the deleterious effects of ambient oxidants.

Architectural windows are generally in the form of an insulated glass unit (IGU). An IGU comprises two spaced apart panes of glass sealed along all four edges. The interior volume is filled with an inert gas, such as argon, so as to provide thermal insulation. When an electrochromic device is incorporated into the IGU it is fabricated on the exterior glass pane (the outdoors facing pane) and is positioned on the interior facing surface thereof. The inert environment within the IGU does not affect the performance of the electrochromic device. However, in case of a failure of the seal of the IGU, for example, there is still a need to protect the electrochromic devices against ambient oxidants.

Figure 1:
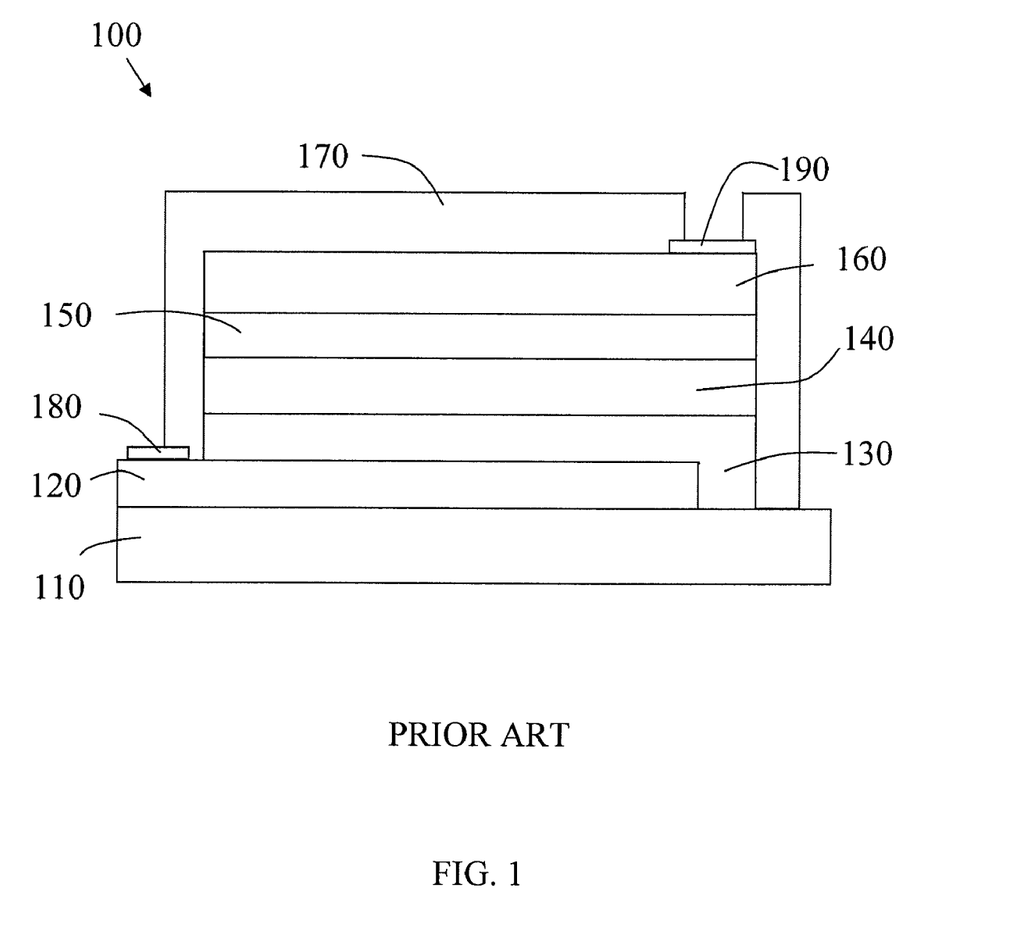
FIG. 1 illustrates a prior art electrochromic device.

A prior art electrochromic device 100 is represented in FIG. 1. See U.S. Pat. No. 5,995,271 to Zieba et al. The device 100 comprises a glass substrate 110, lower transparent conductive oxide (TCO) layer 120, a cathode 130, a solid electrolyte 140, a counter electrode 150, upper TCO layer 160, a protective coating 170, a first electrical contact 180 (to the lower TCO layer 120), and a second electrical contact 190 (to the upper TCO layer 160). Furthermore, there may be a diffusion barrier layer (not shown) between the glass substrate 110 and the lower TCO layer 120, to reduce the diffusion of ions from the glass substrate into the TCO layer, and vice versa. Note that the component layers are not drawn to scale in the electrochromic device shown in FIG. 1. For example, a typical glass substrate is of the order of a millimeter thick and a typical electrochromic device covers the fully exposed area of the architectural glass, or rear-view mirror, for example. Other substrate materials may be used, for example plastics such as polyimide (PI), polyethylene terephthalate (PET) and polyethylene naphthalate (PEN). Typical component layer thicknesses are given in the table below:

| Component Layer | Thickness (microns) |
| --- | --- |
| lower TCO layer | 0.1 to 1.0 |
| cathode | 0.1 to 1.0 |
| solid electrolyte | 0.005 to 0.5 |
| counter electrode | 0.1 to 1.0 |
| upper TCO layer | 0.1 to 1.0 |
| diffusion barrier layer | 0.1 to 1.0 |

Switching from a transparent to a colored state, for example, occurs when ions (such as lithium or hydrogen ions) are driven from the counter electrode 150, through the (non electrically conductive) solid electrolyte 140, to the cathode 130. The counter electrode 150 is an ion storage film, and the cathode 130 is electrochromic—providing the desired change in light transmission properties. It is also possible for the counter electrode 150 to function as the electrochromic layer if this layer undergoes an "anodic coloration," where the layer changes from transparent to colored with de-intercalation of the ion. In this case, the cathode becomes the counter electrode. One can also create greater contrast by combining the effects of both electrodes. A more detailed discussion of the functioning of electrochromic devices is found in Granquvist, C. -G., Nature Materials, v5, n2, February 2006, p 89-90. For the device to function properly, the lower TCO layer 120 and the cathode 130 must be electrically isolated from the counter electrode 150 and upper TCO layer 160. Electrical contact to external driver circuits is made through the first and second electrical contacts 180 and 190.

As is clear from FIG. 1, the device 100 requires patterning of the five active device layers 120-160. This patterning can be done using conventional physical/shadow mask-based lithography techniques. The use of traditional lithography techniques with physical masks leads to many disadvantages, especially related to high volume manufacturing (HVM). For example, the use of physical masks: (1) adds a significant capital investment requirement for HVM and large area scaling; (2) increases the cost of ownership (consumable mask cost, cleaning, chemicals, etc.); (3) decreases the throughput because of alignment requirements; and (4) results in a yield loss, since the masks are prone to flaws which translate to defects in the electrochromic devices, such as color centers and pinholes in protective layers. The presence of pinholes in protective layers will eventually lead to failure of the electrochromic devices due to oxidants reaching the active layers of the devices. This occurs for electrochromic devices sealed in IGUs when the IGU seal becomes compromised and atmospheric oxidants leak into the unit. The desired device lifetimes of tens of years cannot be achieved with pinhole defects in the protective layers. In HVM processes, the use of physical masks (ubiquitous for traditional and current state-of-the-art electrochromic device fabrication technologies) will contribute to higher complexity and higher cost in manufacturing. The complexity and cost result from the requirement to fabricate very accurate masks and the need to use (automated) management systems for mask alignment and regeneration. Such cost and complexity can be inferred from well known photolithography processes used in the silicon-based integrated circuit industry. In addition, the higher cost results from the need for maintaining the masks as well as from throughput limitations by the added alignment steps. The adaptation becomes increasingly more difficult and costly as the manufacturing is scaled to larger area substrates. Moreover, the scaling (to larger substrates) itself can be limited because of the limited availability and capability of the physical masks. This is particularly critical for the architectural window applications, where innumerable shapes and sizes are required. Therefore, there is a need for cost effective, flexible and high volume manufacturing compatible fabrication methods for electrochromic devices. Furthermore, due to the yield issues associated with mask-based lithography fabrication steps, there remains a need for improved methods for patterning the numerous component layers of electrochromic devices.

Patterning of the five active device layers 120-160, shown in FIG. 1, can be done using laser scribing techniques. See U.S. Pat. No. 5,724,175 to Hichwa et al. However, the laser scribing method of Hichwa et al. results in contamination of the exposed edges of the active electrochromic layers due to redeposition during laser ablation of material on the walls of the trench being cut. This contamination can impair the performance of the electrochromic device. Furthermore, particulates are generated during laser ablation and these particles are deposited on the surface of the device. When the protective coating is applied, the presence of particulates on the surface can lead to pinholes in the coating. Pinholes in the protective coating can result in exposure of the device to oxidants from the ambient, and ultimately to premature device failure. There is a need for laser scribing processes which do not impair electrochromic device performance.

In conclusion, there is a need for improved patterning processes for electrochromic devices and a need for improvement in the integration of patterning processes into device fabrication for electrochromic devices.

SUMMARY OF THE INVENTION

The concepts and methods of the invention allow the cost and complexity of electrochromic device high volume manufacturing to be reduced by eliminating and/or minimizing the use of conventional masks to enhance manufacturability of the products at high volume and throughput and on large area substrates. This can significantly reduce the cost for broad market applicability as well as provide yield improvements. This is achieved while ensuring the active layers of the device are protected over the long term from environmental oxidants. According to aspects of the invention, these and other advantages are achieved with the use of laser patterning/scribing to meet certain or all of the patterning requirements, while integrating the laser scribing so as to ensure the active layers of the device are protected to ensure long term reliability. It is envisaged that the laser is used to pattern the component layers of electrochromic devices by directly removing (ablating) the material of the component layers. As such, this invention contemplates laser patterning integrated into the manufacturing process as deemed appropriate and necessary for electrochromic device manufacturability, yield, functionality, and long term reliability. This includes a manufacturing method for an electrochromic device comprising the following steps: (1) depositing a first transparent conductive layer followed by a cathode on a transparent substrate; (2) patterning the cathode; (3) depositing an electrolyte layer, followed by a counter electrode layer, followed by a second transparent conductive layer; (4) focused laser patterning the electrolyte, counter electrode and transparent conductive layers; (5) depositing a diffusion barrier; and (6) forming separate electrical contacts to the first transparent conductive layer and the second transparent conductive layer. The patterning step in (2) may also be a focused laser patterning process. In this method laser patterning of the first transparent conductive layer and the cathode layer occurs before deposition and laser patterning of the remaining layers, thus eliminating any contamination of the remaining layers due to redeposition of the transparent conductive material and cathode material on their surfaces. Furthermore, during focused laser patterning, ablated material generated by the focused laser patterning may be removed. In general, redeposition of ablated material and particulate contamination due to laser ablation can be minimized by using tactics such as spatially separating edges of upper and lower layers and/or patterning of lower layers prior to deposition of upper layers.

Another manufacturing method for an electrochromic device includes the following steps: (1) sequentially depositing layers corresponding to an electrochromic device on a substrate, a first layer being a first transparent conductive layer and a last layer being a second transparent conductive layer; (2) focused laser patterning the layers, where the patterning isolates separate electrochromic devices on the substrate and exposes the surface of a first transparent conductive layer for making electrical contact; (3) during the focused laser patterning, removing ablated material generated by the focused laser patterning; (4) depositing a diffusion barrier; and (5) forming separate electrical contacts to the first transparent conductive layer and the second transparent conductive layer.

In the above methods, as material is ablated by the laser patterning process it may be removed by: vacuum suction in very close proximity to the site of laser ablation; and/or a jet of inert gas directed across the surface of the device in the vicinity of laser ablation. In addition, a (cooled) surface can be strategically placed near the focal point of the ablating region (e.g., where the suction or gas jet is placed) to capture (via deposition) the ablated materials. Furthermore, the laser patterning step may be performed by a laser beam focused directly on the deposited layers from above, by a laser beam directed through the transparent substrate, or by a combination of both.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

In general, the present invention contemplates an alternative method of patterning certain or all layers in an electrochromic device structure using a laser patterning/scribing technique. The present inventors recognize that reducing and/or minimizing the use of physical masks greatly benefits the manufacturing process for electrochromic devices, particularly for high-volume manufacturing and large substrates. Some of the key benefits of laser patterning are: the positive impact on yield; and the laser allows flexibility in device patterning to accommodate end-market defined form factors, without having to create new expensive physical masks or reticles. Laser patterning techniques, also referred to as laser scribing, are well known in the semiconductor and photovoltaic industries. The present invention envisages the use of lasers to directly remove material (ablate material) to create patterned component layers in the electrochromic devices. The lasers are carefully optimized and focused, so as to provide accurate edge placement for the features patterned and to allow for removal of one layer while leaving an underlying layer intact. Since electrochromic devices are fabricated on transparent substrates the lasers can be directed either through the substrate or from the top in order to pattern the component layers. In the case of large area substrates, and in order to reduce patterning process times, multiple lasers can be used at once to pattern devices on a single substrate. Furthermore, as discussed herein, techniques are employed for minimizing redeposition of material during laser ablation onto the exposed edges of the active layers of the electrochromic device. These same approaches can be used to minimize particulate deposition from ablated material over all of the surfaces of the device.

Various types of lasers can be used to perform the laser patterning/scribing function depending on the optical absorption characteristics of the materials used for the electrochromic device and their thicknesses. Some of the lasers that can be employed include high power CO2 lasers (e.g. 10 micron wavelength) and Nd-doped solid state lasers (e.g. Nd:YAG at 1046 nm, and 523 nm with a frequency doubler). Multiple lasers may be used to perform the laser patterning/scribing function, including lasers with different wavelengths. The depth of the ablation (the number of layers in the device stack that are removed) is controlled by the laser power, focus and scanning speed. Furthermore, specificity of the layer to be ablated can be achieved by using a specific laser wavelength that affects only the desired layer. The laser patterning/scribing is typically conducted in an inert gas environment, or under vacuum. Debris and gases generated during ablation of the device layers may be removed using vacuum/suction in close proximity to the ablation site. Furthermore, debris and gases may be removed from the vicinity of the electrochromic device by applying a jet of inert gas across the surface of the device in the region where laser ablation is taking place. Yet further, a (cooled) surface can be strategically placed near the focal point of the ablating region (e.g., where the suction or gas jet is placed) to capture (via deposition) the ablated materials. The (cooled) surface may be that of a plate made of metal, or other materials, or of any object that is suitable for use in the laser ablation environment for capturing ablated material (via deposition). Generally, the ablated materials are not volatile and will readily deposit on surfaces at room temperature. Those skilled in the art of laser patterning/scribing will be familiar with the choice of lasers for patterning/scribing applications, and setting-up laser tools to implement patterning/scribing processes.

Figure 2A:
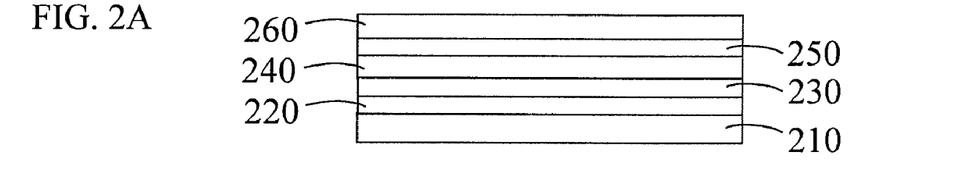
FIGS. 2A to 2E illustrate an example electrochromic device fabrication process according to aspects of the invention.
Figure 2B:
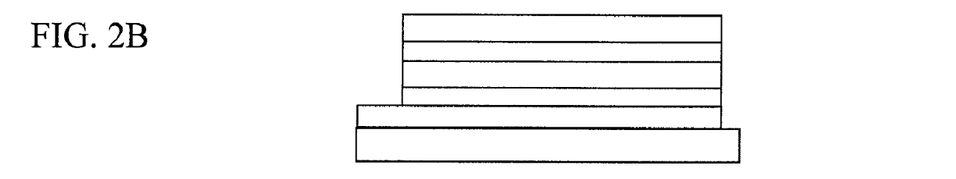
Figure 2C:
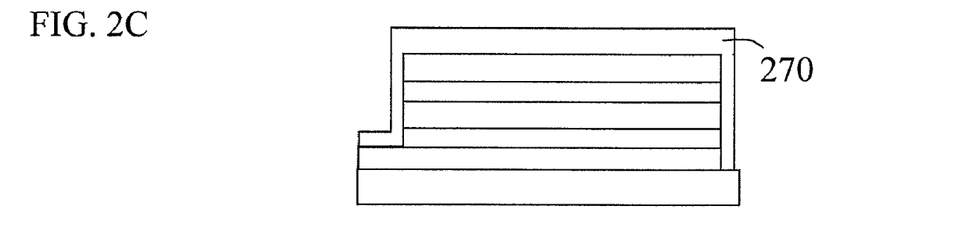
Figure 2D:
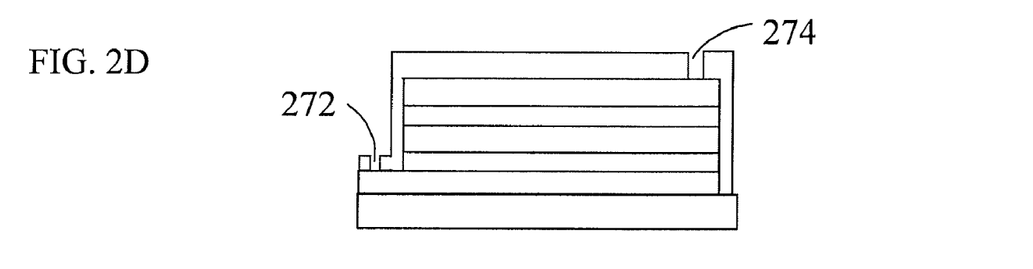
Figure 2E:
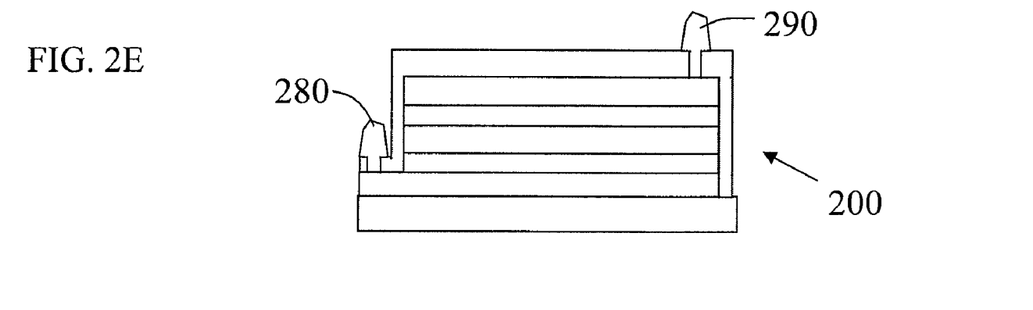

FIGS. 2A to 2E show a first embodiment of a method for manufacturing an electrochromic device 200 according to the invention. FIG. 2A shows a stack of five layers which have been deposited on the substrate 210. The substrate may be glass or plastic. The layers, in order from the substrate, are lower transparent conductive oxide (TCO) layer 220, a cathode 230, a solid electrolyte 240, a counter electrode 250, and an upper TCO layer 260. The layers are deposited one after another using deposition techniques known to those skilled in the art. The lower and upper TCO layers 220 and 260 are typical sputter-deposited indium tin oxide (ITO). The cathode 230 and counter electrode are typically made of transition metal oxides and are typically deposited by physical vapor deposition methods. The solid electrolyte 240 is typically made of ceramic/oxide solid electrolytes such as lithium phosphorus oxynitride and LixSiO2, that can be deposited using various methods including physical and chemical vapor deposition methods. FIG. 2B shows the stack after the first patterning step. This patterning step: (1) electrically isolates individual devices by cutting through the entire stack down to the substrate; and (2) exposes the top surface of the lower TCO layer 220 to allow for making electrical contact to the lower TCO layer 220. The first patterning is preferably implemented by a laser patterning tool. FIG. 2C shows the addition of diffusion barrier layer 270, covering the entire stack including the exposed vertical edges. The diffusion barrier layer 270 should be transparent, electrically insulating, and be capable of passivating the exposed surfaces, with low permeability to ambient oxidants, like O2 and H2O. FIG. 2D shows the device after the diffusion barrier 270 has been patterned to open up areas 272 and 274 for making electrical contact, respectively, to the lower and upper TCO layers 220 and 260. The second patterning is preferably implemented by a laser patterning tool. Finally, FIG. 2E shows the device after making a first electrical contact 280 (to the lower TCO layer 220), and a second electrical contact 290 (to the upper TCO layer 260). Optionally, a diffusion barrier layer may be added between the substrate 210 and the lower TCO layer 220. (Not shown in FIG. 2.) This diffusion barrier layer should be transparent, electrically insulating, and be capable of passivating the exposed surfaces, with low permeability to ions such as Na, B and Li (in the case of Li electrochromic devices).

In a second embodiment of the method for manufacturing an electrochromic device according to the invention, the method according to FIGS. 2A through 2C is followed, then the electrical contacts are made through the barrier layer 270, without the need to open up contact areas 272 and 274 in the barrier layer 270. This method of making contact works by diffusing the contact material through the diffusion barrier layer to make an electrically conductive path. This results in the same final device as shown in FIG. 2E, except the first and second electrical contacts 280 and 290 sit on the diffusion barrier layer 270 and make electrical contact to the lower and upper TCO layers 220 and 260, respectively, through the diffusion barrier layer 270 (made locally conductive by contact material diffused into the diffusion barrier layer). This method is applicable when the diffusion barrier layer is either very thin or relatively porous. This may be the case when the demands on the diffusion barrier layer are less stringent due to the presence of an alternative method for protecting the electrochromic devices from ambient oxidants. For example, the electrochromic devices might be incorporated into low-e insulating glass units (IGUs) which are sealed with an inert gas within.

The first embodiment of a method of the invention, described above with reference to FIGS. 2A-2E, includes a first patterning step which cuts through all five layers of the stack. When laser patterning/scribing is used to implement this patterning step there may be some risk of redeposition of ablated material onto the newly exposed edges of the stack. This redeposition may result in shorting between layers or contamination of the active layers. If redeposition is a problem there are alternative methods of the invention that can be used which spatially separate the edges and minimize redeposition by patterning some of the lower conductive layers prior to depositing and patterning the upper layers. These methods include the addition of one or more patterning steps. An example of such a method is the embodiment shown in FIGS. 3A to 3E where the edges of the cathode 330 are spatially separated from the edges of the layers in the stack above it and the cathode 330 and lower transparent conductive oxide layer 320 are patterned prior to deposition and patterning of the upper layers.

Figure 3A:
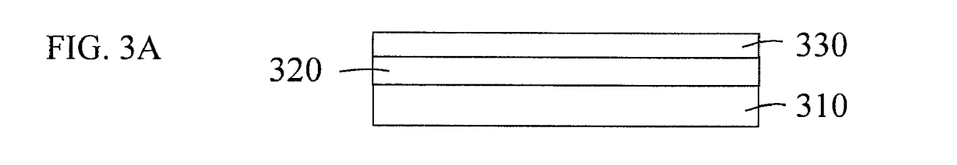
FIGS. 3A to 3E illustrate additional aspects of an example electrochromic device fabrication process of the invention.
Figure 3B:
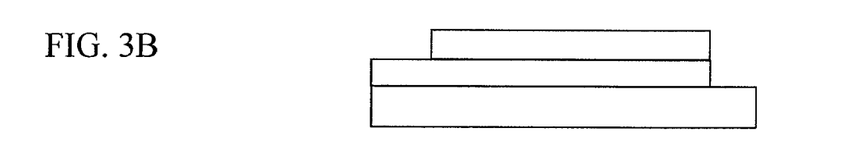
Figure 3C:
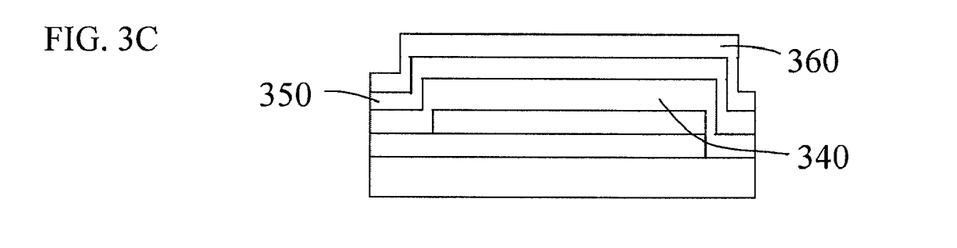
Figure 3D:
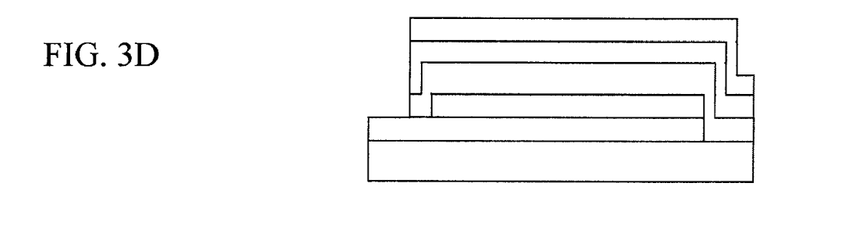
Figure 3E:
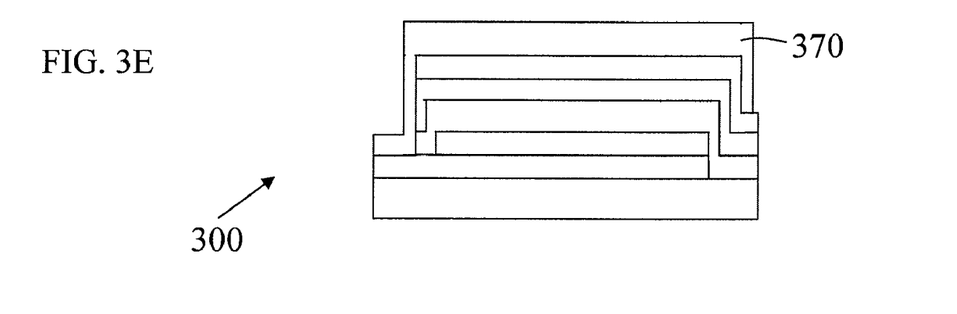

FIGS. 3A to 3E show a third embodiment of a method for manufacturing an electrochromic device 300 according to the invention. FIG. 3A shows a stack of two layers which have been deposited on the substrate 310. The layers, in order from the substrate, are lower transparent conductive oxide (TCO) layer 320, and a cathode 330. The layers are deposited one after another using deposition techniques known to those skilled in the art. FIG. 3B shows the stack after the first patterning step. This patterning step: (1) electrically isolates individual devices by cutting through the stack down to the substrate; and (2) exposes the top surface of the lower TCO layer 320 to allow for making electrical contact to the lower TCO layer 320. The first patterning is preferably implemented by a laser patterning tool. FIG. 3C shows the addition of another three layers: a solid electrolyte 340, a counter electrode 350, and an upper TCO layer 360. The layers are deposited one after another using deposition techniques known to those skilled in the art. FIG. 3D shows the stack after the second patterning step. This patterning step: (1) electrically isolates the counter electrode 350 and upper TCO layer 360; and (2) exposes the top surface of the lower TCO layer 320 again to allow for making electrical contact to the lower TCO layer 320. The second patterning is preferably implemented by a laser patterning tool. FIG. 3E shows the addition of diffusion barrier layer 370, covering the entire stack including the exposed vertical edges. The process now proceeds as in either the first embodiment of the method, as shown in FIGS. 2A-2E, or the second embodiment described above.

Figure 4:
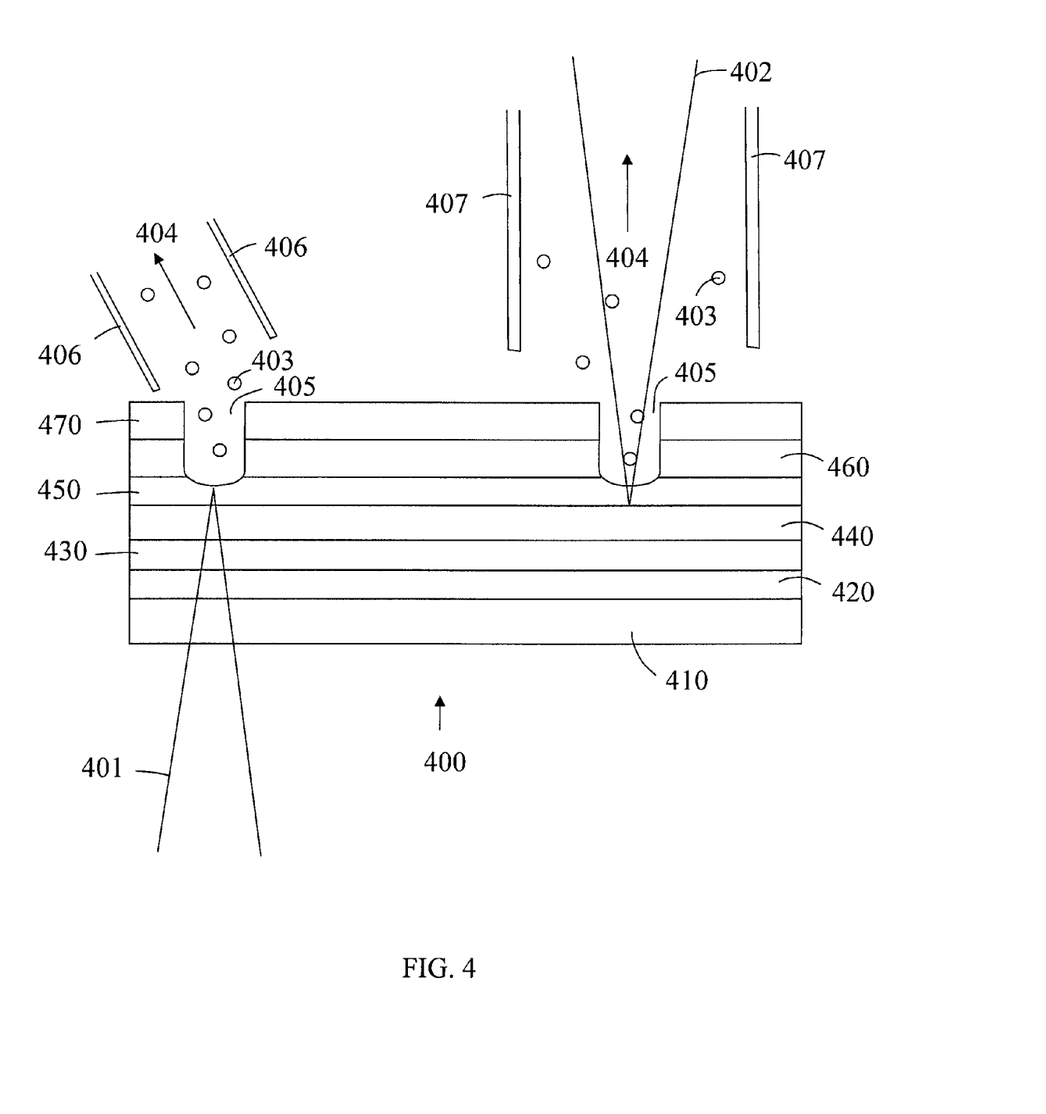
FIG. 4 illustrates examples of laser scribing and ablated material removal process steps in the fabrication of electrochromic devices according to aspects of the invention.

FIG. 4 shows a stack 400 with substrate 410 and layers 420-470, equivalent to layers 120-170 described above. The stack 400 is subject to laser patterning/scribing by a laser 401 focused on the stack through the substrate 410 and a laser 402 focused on the stack from above. The laser 401 was originally focused on layer 470 and as the layer ablated the laser focus was moved down to layer 460 and then to layer 450 (shown in FIG. 4), forming a hole 405. As the laser ablates the layers of the stack 400, debris 403 is produced. Tube 406 (shown in cross-section) is connected to a vacuum pump/suction generator and is shown removing debris 403 along the tube 406 in direction 404. Depending on the pattern required, the number of layers to be removed, and the optical properties of the component layers, the laser may be scanned to remove material layer by layer (requiring repeated scanning of the same pattern area—once for each layer to be removed) or may be scanned across the pattern area once, cutting through multiple layers. The laser 402 was originally focused on layer 470 and as the layer ablated the laser focus was moved down to layer 460 and then to layer 450 (shown in FIG. 4), forming a hole 405. As the laser ablates the layers of the stack 400 debris 403 is produced. Tube 407 (shown in cross-section) is connected to a vacuum pump/suction generator and is shown removing debris 403 along the tube 407 in direction 404. The laser beam 402 is shown traveling through the tube 407; however, the tube may be placed to one side of the laser beam if desired. The laser beam 402 is scanned as described above for laser beam 401.

Figure 5:
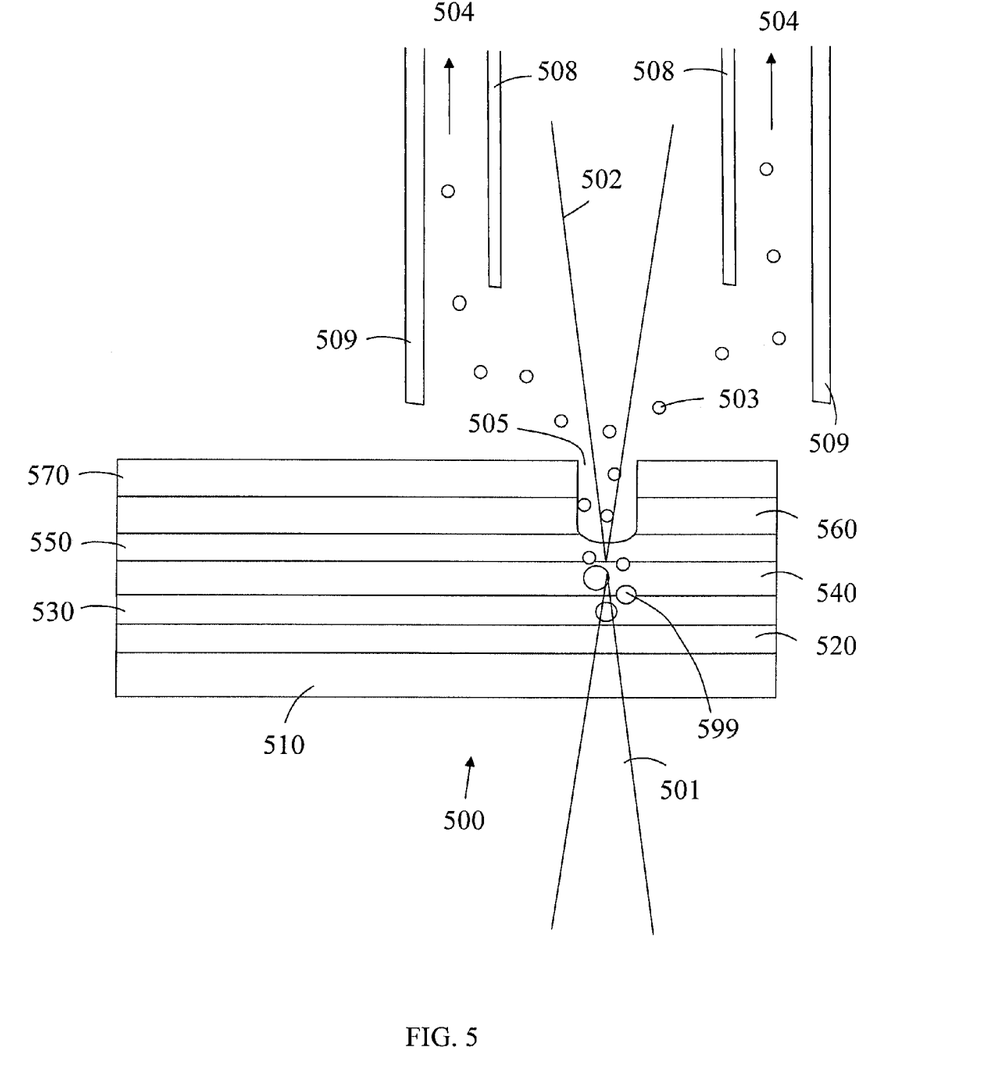
FIG. 5 illustrates an additional example of laser scribing and ablated material removal process steps in the fabrication of electrochromic devices according to aspects of the invention.

FIG. 5 shows a stack 500 with substrate 510 and layers 520-570, equivalent to layers 120-170 described above. The stack 500 is subject to laser patterning/scribing by a laser 501 focused on the stack through the substrate 510 and a laser 502 focused on the stack from above, both lasers being focused simultaneously on the same general area. Together the lasers have ablated material to form hole 505. The laser 502 is shown focused on layer 550 and laser 501 is shown focused on layer 540. As the lasers ablate the layers of the stack 500, debris 503 and bubbles 599, of vaporized material, are produced. Tubes 509 and 508 (shown in cross-section) together form an annular space through which debris 503 is removed in direction 504. (The annular space is connected to a vacuum pump/suction generator.) The laser beam 502 is shown traveling through the middle of tube 508; however, tubes as shown in FIG. 4 may be used instead of tubes 508 and 509. The laser beams 501 and 502 are scanned as described above for laser beam 401.

Figure 6:
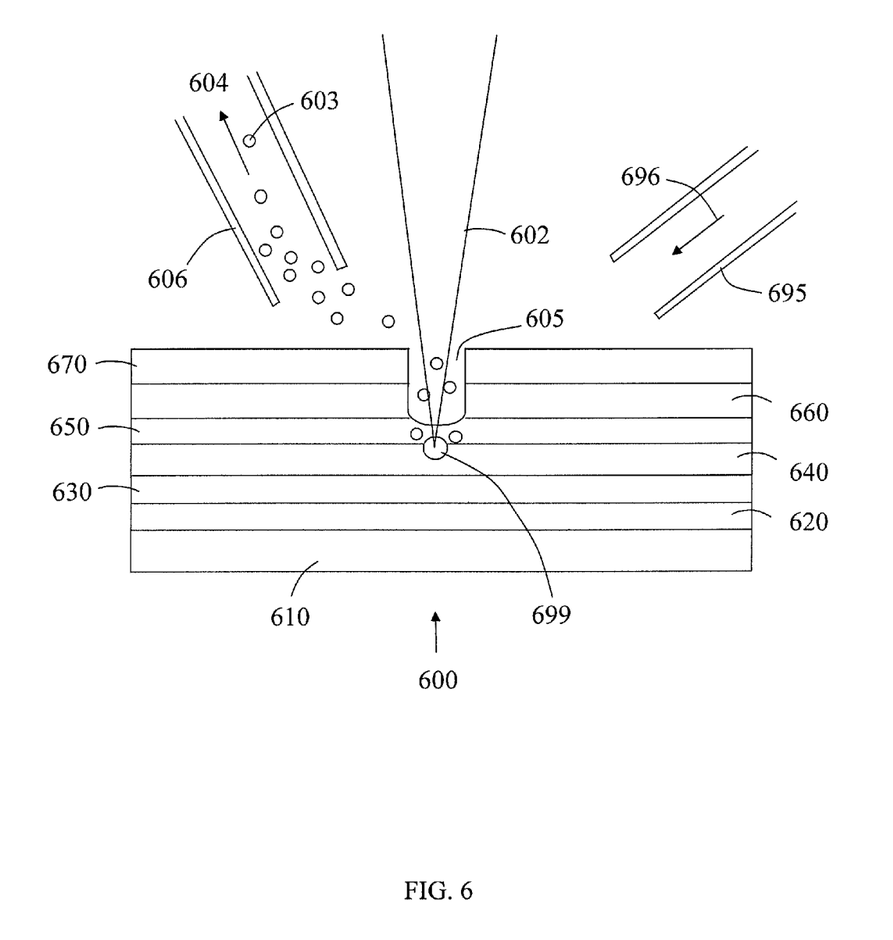
FIG. 6 illustrates a further example of laser scribing and ablated material removal process steps in the fabrication of electrochromic devices according to aspects of the invention.

FIG. 6 shows a stack 600 with substrate 610 and layers 620-670, equivalent to layers 120-170 described above. The stack 600 is subject to laser patterning/scribing by a laser 602 focused on the stack from above. The laser 602 was originally focused on layer 670 and as the layer ablated the laser focus was moved down to layer 660 and then to layer 650 (shown in FIG. 6), forming a hole 605. As the laser ablates the layers of the stack 600, debris 603 and bubbles 699, of vaporized material, are produced. Tube 695 (shown in cross-section) is connected to a supply of inert gas, such as argon, and delivers a jet of inert gas onto the surface of the stack 600, in the direction 696. The jet of inert gas blows the debris 603 away from the site of laser ablation across the surface of the wafer. Here the debris is shown being collected by a suction tube 606. However, a jet of inert gas alone can be effective in removing debris away from the site of laser ablation and off the surface of the stack 600. Tube 606 (shown in cross-section) is connected to a vacuum pump/suction generator and is shown removing debris 603 along the tube 606 in direction 604. The laser beam 602 is scanned as described above for laser beam 401.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A method of manufacturing an electrochromic device comprising:
   depositing a first transparent conductive layer followed by a cathode on a transparent substrate;
   patterning said first transparent conductive layer and said cathode, said patterning electrically isolating individual electrochromic devices and exposing the top surface of said first transparent conductive layer;
   depositing an electrolyte layer, followed by a counter electrode layer, followed by a second transparent conductive layer;
   focused laser patterning said layers deposited in said second deposition step, wherein, during and after said focused laser patterning, for each said electrochromic device said electrolyte layer completely covers the top surface of said cathode and the edges of said cathode;
   depositing a diffusion barrier; and
   forming separate electrical contacts to said first transparent conductive layer and said second transparent conductive layer.

2. The method of claim 1, wherein said first patterning step is a focused laser patterning process.

3. The method of claim 1, further comprising, before said forming separate electrical contacts, patterning said diffusion barrier layer.

4. The method of claim 3, wherein said patterning said diffusion barrier layer step is a focused laser patterning process.

5. The method of claim 1, further comprising, during said focused laser patterning, removing ablated material generated by said focused laser patterning.

6. The method of claim 5, wherein said removing step includes providing a deposition surface for deposition of said ablated material thereon.

7. The method of claim 5, wherein said removing step includes vacuum suctioning said ablated material during said laser patterning.

8. The method of claim 7, wherein said vacuum suctioning is performed by a suction tube.

9. The method of claim 5, wherein said removing step includes directing a jet of inert gas across the surface of said device in the vicinity of said ablating deposited layers.

10. The method of claim 1, wherein said focused laser patterning step includes focusing a laser beam on one of the deposited layers, said laser beam passing through said transparent substrate before reaching the deposited layers.

11. The method of claim 1, wherein said focused laser patterning step is performed by a plurality of focused laser beams, and wherein said plurality of focused laser beams includes a first laser beam focused on a first part of said layers deposited in said second deposition step and a second laser beam focused on a second part of said layers deposited in said second deposition step, said first laser beam passing through said transparent substrate before reaching said first part, and said second laser beam reaching said second part without first passing through said transparent substrate.

12. The method as in claim 11, wherein said first part and said second part are the same part.

13. The method of claim 12, wherein said first laser beam and said second laser beam are simultaneously incident on said same part.

14. A method of manufacturing an electrochromic device comprising:
   sequentially depositing layers corresponding to an electrochromic device on a substrate, a first layer being a first transparent conductive layer and a last layer being a second transparent conductive layer;
   focused laser patterning said layers, said patterning (1) isolating separate electrochromic devices on said substrate and (2) exposing a first transparent conductive layer for making electrical contact;
   during said focused laser patterning, removing ablated material generated by said focused laser patterning;
   depositing a diffusion barrier; and
   forming separate electrical contacts to said first transparent conductive layer and said second transparent conductive layer;
   wherein said focused laser patterning is performed by a plurality of focused laser beams, wherein said plurality of focused laser beams includes a first laser beam focused on a first part of the sequentially deposited layers corresponding to an electrochromic device on said substrate and a second laser beam focused on a second part of the sequentially deposited layers corresponding to an electrochromic device on said substrate, said first laser beam passing through said transparent substrate before reaching said first part, and said second laser beam reaching said second part without first passing through said transparent substrate, and wherein said first part and said second part are the same part.

15. The method of claim 14, further comprising patterning said diffusion barrier layer.

16. The method of claim 15, wherein said patterning said diffusion barrier layer step is a focused laser patterning process.

17. The method of claim 14, wherein said removing step includes providing a deposition surface for deposition of said ablated material thereon.

18. The method of claim 14, wherein said removing step includes vacuum suctioning said ablated material during said laser patterning.

19. The method of claim 18, wherein said vacuum suctioning is performed by a suction tube.

20. The method of claim 14, wherein said removing step includes directing a jet of inert gas across the surface of said device in the vicinity of said ablating deposited layers.

21. The method of claim 14, wherein said first laser beam and said second laser beam are simultaneously incident on said same part.

22. The method of claim 14, wherein said sequentially depositing layers comprises the sequential deposition of a first transparent conductive layer, a cathode layer, an electrolyte layer, a counter electrode layer and a second transparent conductive layer.

23. The method of claim 1, wherein said focused laser patterning electrically isolates said counter electrode layer and said second transparent conductive layer for each said individual electrochromic device and exposes the top surface of said first transparent conductive layer.

24. The method of claim 6, wherein said deposition surface is cooled.

25. The method of claim 17, wherein said deposition surface is cooled.

* * * * *